United States Patent

[11] 3,625,944

[72] Inventors Edward J. J. Grabowski
 Iselin;
 Edward W. Tristram, Cranford; Roger J. Tull, Metuchen, all of N.J.
[21] Appl. No. 766,652
[22] Filed Oct. 10, 1968
[45] Patented Dec. 7, 1971
[73] Assignee Merck & Co., Inc.
 Rahway, N.J.

[54] METHOD FOR PREPARATION OF CHLORINATED METHYL PYRAZINES
 4 Claims, No Drawings
[52] U.S. Cl. ..................................... 260/250, 424/250
[51] Int. Cl. ...................................... C07d 51/76

[50] Field of Search ........................................... 260/250

[56] References Cited
 UNITED STATES PATENTS
 3,501,472 3/1970 Wilcox et al. .................. 260/250
 3,344,142 9/1967 Powell et al. .................. 260/250

Primary Examiner—Nicholas S. Rizzo
Attorneys—Erma R. Coutts, Harry E. Westlake, Jr. and I. Louis Wolk ABSTRACT: The direction chlorination of methylpyrazine by heating in a solvent to provide chlorinated 2-methylpyrazine compounds is described. The compounds are useful as intermediates in preparing the therapeutically active (3-aminopyrazinoyl) guanidine products which are effective natriuretic and antikaluretic compounds.

METHOD FOR PREPARATION OF CHLORINATED METHYL PYRAZINES

This invention is concerned with novel chlorinated methylpyrazine compounds having at least two chlorine atoms attached to the methylpyrazine structure.

The novel chlorinated methylpyrazine products of this invention can be illustrated by the structure

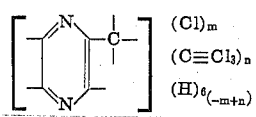

wherein $m$ represents the numerals 2 through 5 and $n$ is 0 or 1, with the proviso that when $n$ is 1, the (C Cl$_3$) group is a nuclear substituent.

The novel chlorinated methylpyrazine compounds of this invention have been found to be especially useful as intermediates in the preparation of a variety of compounds, particularly in the preparation of the known (3-aminopyrazinoyl)quanidine diuretic products which are effective in the treatment of edematous conditions and especially valuable because of their antikaliuretic properties. Some of the products are also useful in the preparation of pyraziniminocarboxylic acid amides or hydrazides known to possess antitubercular and analeptic properties, exhibiting marked stimulating effects upon the cardiac, circulatory and respiratory systems.

It is known, from the work concerning the preparations of pyrazinoylguanidine compounds that it is difficult to introduce a substituent in the 5-position in relation to the carbonyl group particularly when it is desired to have an amino substituent in this position and especially when the 3-position carbon does not carry a substituent. The novel products of this invention, particularly the 2-chloro-3-chloromethylpyrazine compounds are especially useful as intermediates for the preparation of these valuable products as they are easily converted to the esters of the 3-aminopyrazinoic acid, 3,5-diaminopyrazinoic acid or 3,5-diamino-6-chloropyrazinoic acid, the intermediates needed for the preparation of the therapeutically useful pyrazinoylguanidine diuretic products, the preparation of which from the esters is described in U.S. Pat. No. 3,313,813 which issued Apr. 11, 1967.

The trichloromethylpyrazine compounds of this invention have been found additionally to be especially suitable intermediates for making the pyrazinamide products described in U.S. Pat. No. 2,149,279 as effective agents in the treatment of tuberculosis as well as possessing useful analeptic properties.

The novel method for preparing the chlorinated methylpyrazine products of this invention also forms part of the invention. Additionally, the methods by which the chlorinated methylpyrazines are converted to the 3-aminopyrazinoate products and the method for preparing the pyrazinamide products also form part of this invention.

It was found that direct chlorination of 2-methyl-pyrazine could be effected in acetic acid or in carbon tetrachloride at elevated temperatures preferably at an elevated temperature advantageously between the reflux temperature of the reaction medium up to about 250° C. The number of chlorine atoms that become attached to the methylpyrazine starting material is a function of the temperature employed as well as the length of time the reaction is carried out; the longer the reaction time and/or the higher the temperature the more chlorine atoms become attached.

The chlorinated methylpyrazines then can be converted to alkyl 3- or 5-aminopyrazinoates which then are employed as described in U.S. Pat. No. 3,313,813 in the preparation of the therapeutically useful (3-aminopyrazinoyl)quanidines, by first reacting the chlorinated methylpyrazine with hydroxylamine. It was unexpectedly found that instead of a hydroxylamine derivative being formed, an amino derivative was produced by this reaction, the amino substituent being attached to the 5- position in relation to the methyl substituent. The reaction advantageously is carried out in the presence of a solvent such as ethanol under basic conditions. Best results are obtained when the reaction mixture is heated preferably at reflux temperature for a period of from 1 to several hours. The 5-amino-2-(hydroxyliminomethyl) product obtained is acylated by treatment with an alkanoic anhydride and then pyrolyzed to yield a 5-amino-2-cyanopyrazine. Acylation advantageously is conducted with cooling and is completed within a very short time, generally from a few minutes up to about 30 minutes. The product obtained then can be separated, if desired, and suspended in an inert medium such as xylene and heated preferably to reflux from 1 to several hours whereupon a 5-amino-2-cyanopyrazine is obtained. Hydrolysis of this product with strong mineral acid, preferably sulfuric acid, produces the corresponding amide which, upon addition of an alkanol or aralkanol forms the corresponding ester of 5-aminopyrazinoic acid. When the chlorinated methylpyrazine starting material employed in this reaction is 2-chloro-3-dichloromethylpyrazine the product obtained by the reaction just described is an ester of 5-amino-3-chloropyrazinoate. The 3-chloro group then can be replaced by an amino group by reaction of this product with ammonia to form the ester of 3,5-diaminopyrazinoic acid which upon reaction with guanidine forms the diuretic product, (3,5-diaminopyrazinoyl)quanidine. Alternatively, the ester of 5-amino-3-chloropyrazinoate can be treated with chlorine to form the desired ester of 5-amino-3,6-dichloropyrazinoate which upon treatment with ammonia provides the ester of 3,5-diamino-6-chloropyrazinoic acid. Reaction of this ester with guanidine by the process described in U.S. Pat. No. 3,313,813 gives the (3,5-diamino-6-chloropyrazinoyl)quanidine.

Other methods are described in the following "Preparations" for preparing 3-aminopyrazinoic acid esters from the novel chlorinated methylpyrazines of this invention.

In the preparation of the pyrazinamide tuberculostatic and analeptic agents of U.S. Pat. No. 2,149,279, the selected chlorinated methylpyrazine and in particular the 2-(trichloromethyl) pyrazine compound is initially converted to an ester by the reaction of said compound with an alkanol to give the lower alkyl pyrazinoate. This product upon reaction with ammonia is readily converted to the desired pyrazinamide or it can be reacted with hydrazine to form a pyrazinoic acid hydrazide product.

The preparation of the novel chlorinated methylpyrazines as well as their use as intermediates in making the products described hereinabove is more fully described in the following examples and preparations.

EXAMPLE 1

2-Chloro-3-(chloromethyl)pyrazine pyrazine

Chlorine is passed through a solution of 6.12 g. (47.6 mmoles) of 2-chloro-3-methylpyrazine in carbon tetrachloride at reflux at a rate of 2 mmole/min. for 3 hours. Removal of the solvent at reduced pressure leaves an oil which contains 2-chloro-3-(chloromethyl)pyrazine, yield 41 percent of theory as determined by VPC. This compound was characterized as its pyridinium salt by reaction with an equivalent of of pyridine in benzene. The salt melts at >300° C.; UV (CH$_3$OH) A% 398 at 267.5 m$\mu$, A% 620 at 210 m$\mu$.

Analysis calculated for $C_{10}H_9Cl_2N_3$:
C, 49.6; H, 3.8;    Cl (total)29.3; N,17.4;
                    Cl (ionic)14.7;
Found: C, 49.6; H, 3.6;    Cl (total)29.0; N, 17.3;
                           Cl (ionic)15.0;

EXAMPLE 2

2-Chloro-3-(dichloromethyl)pyrazine

A solution of 128.6 g. (1.0 mole) of 2-chloro-3-methylpyrazine in 900 ml. of glacial acetic acid is maintained at 100° C. while chlorine is passed through the solution at a rate of 10 mmole/min. for 4 hours. The reaction solution is cooled to 25°

C. and 6 liters of water is added to it. The resulting yellow crystals are filtered, washed with 1.0 liter of water, dried under vacuum at 25° C. and recrystallized from petroleum ether to yield 77.6 g., 52 percent of theory of 2-chloro-3-(dichloromethyl)pyrazine: m.p. 45.5°–46.5° C., UV (CH₃OH) A% 340 at 276 mµ, A% 441 at 215 mµ.

Analysis calculated for C₅H₃Cl₃N₂:
C, 30.4; H, 1.5;   Cl, 53.9; N, 14.2;
Found: C, 30.6; H, 1.4;   Cl, 54.1; N, 14.4.

EXAMPLE 3

2-Chloro-3-(dichloromethyl)pyrazine and 3,5-Dichloro-2-(dichloromethyl)pyrazine

2-Chloro-3-methylpyrazine (27.71 g., 0.215 mole) and chlorine (65 g., 0.9 mole) in 250 ml. of acetic acid is heated in a closed vessel at 100° C. for 3 hours. The acetic acid is removed at reduced pressure and the residual oil dissolved in 200 ml. of chloroform, washed with 200 ml. of water and 200 ml. of 5 percent sodium bicarbonate solution and dried over sodium sulfate. Removal of the chloroform at reduced pressure, after filtration leaves 26.84 g. of a yellow oil which contains 8.1 g., 25 percent of theory, of 2-chloro-3-(dichloromethyl)pyrazine and 16.1 g., 32 percent of theory, of 3,5-dichloro2-(dichloromethyl)pyrazine by VPC. The latter component can be isolated by fractional crystallization and recrystallized from petroleum ether to give white needles: m.p. 53.5°–54.5° C.; UV (CH₃OH) A% 286 at 290 mµ, A% 311 at 283 mµ, A% 470 at 225 mµ.

Analysis calculated for C₅H₂Cl₄N₂:
C, 25.9; H, 0.9;   Cl, 61.2; N, 12.1;
Found: C, 26.1; H, 0.8;   Cl, 61.1; N, 12.2.

EXAMPLE 4

2-(Trichloromethyl)pyrazine

Chlorine is passed through a solution of 77.0 g. (0.819 mole) of 2-methylpyrazine in 750 ml. of glacial acetic acid, maintained at 100° C. for 4 hours at a rate of 15 mmole/min. The brown oil formed after the addition of 2 liters of water is extracted with 2 liters of ether. Removal of the ether at reduced pressure leaves a brown oil which can be recrystallized from 1 liter of petroleum ether to yield 60.5 g., 44 percent of theory of 2-(trichloromethyl)pyrazine: m.p. 38°–39° C.; UV (CH₃OH) A% 33.5 at 310 mµ, A% 354 at 266 mµ.

Analysis calculated for C₅H₃Cl₃N₂:
C, 30.4; H, 1.5;   Cl, 53.9; N, 14.2;
Found: C, 30.3; H, 1.3;   Cl, 53.8; N, 13.9

EXAMPLE 5

5-Chloro-2-(trichloromethyl)pyrazine and 6-Chloro-2-(trichloromethyl)pyrazine

A solution of 5.00 g. (25.3 mmoles) of 2-(trichloromethyl)pyrazine from example 4 and 12 g. (170 mmole) of chlorine in 50 ml. of carbon tetrachloride is heated at 200° C. for 5 hours. Removal of the carbon tetrachloride at reduced pressure, after treatment of the reaction solution with 0.5 g. of decolorizing charcoal gives an oily crude product which is shown by VPC to contain 1.8 g. (30 percent) of 6-chloro-2-(trichloromethyl)pyrazine, and 1.3 g. (22 percent) of 5-chloro-2-(trichloromethyl)pyrazine. The latter isomer crystallizes spontaneously in the crude product mixture and is recrystallized from petroleum ether to form white needles: m.p. 76°–77° C.; UV (CH₃OH) A% 337 at 278 mµ, A% 325 at 275 mµ, A% 441 at 219 mµ.

Analysis calculated for C₅H₂Cl₄N₂:
C, 25.9; H, 0.9;   Cl, 61.2; N, 12.1;
Found: C, 26.2; H, 1.0;   Cl, 61.5; N, 11.9.

The isomer formed in greater yield can be isolated by preparative VPC.

EXAMPLE 6

2-Chloro-3-(trichloromethyl)pyrazine

A solution of 6.12 g. (47.6 mmole) of 2-chloro-3-methylpyrazine and 27 g. (380 mmole) of chlorine in 50 ml. of carbon tetrachloride is heated at 200° C. for 5 hours. Removal of the carbon tetrachloride at reduced pressure gives an orange oil which as shown by VPC contains 5.3 g. (64 percent) of 2-chloro-3-(trichloromethyl)pyrazine. Purification by preparative VPC, provides the product as a colorless liquid at room temperature: UV (CH₃OH) A% 284 at 274 mµ, A% 272 at 270 mµ, A% 323 at 220 mµ.

Analysis calculated for C₅H₂Cl₄N₂:
C, 25.9; H, 0.9;   Cl, 61.2; N, 12.1;
Found: C, 25.6; H, 0.7;   Cl, 60.1; N, 12.2.

EXAMPLE 7

2,3-Dichloro-5-(trichloromethyl)pyrazine and 3-Chloro-2,5-bis(trichloromethyl)pyrazine A solution of 14.55 g. (0.134 mole) of 2,5-dimethylpyrazine and 113 g. (1.6 mole) of chlorine in 150 ml. of carbon tetrachloride is heated at 230° C. for 5 hours. Removal of the solvent at reduced pressure, after treatment with 1.0 g. of decolorizing charcoal gives an oil which yields 14.45 g. (30 percent) of 3-chloro-2,5-bis(trichloromethyl)pyrazine as white cubes upon crystallization from 100 ml. of petroleum ether: m.p. 112.5°–113.5° C.; UV (CH₃OH) A% 254 at 281 mµ, A% 288 at 226 mµ.

Analysis calculated for C₆HCl₇N₂:
C, 20.6; H, 0.3;   Cl, 71.1; N, 8.0;
Found: C, 21.0; H, 0.3;   Cl, 70.7; N, 8.0.

Removal of the petroleum ether from the mother liquor gives an oil which is shown by VPC to contain 9.8 g. (27 percent) of 2,3-dichloro-5(trichloromethyl)pyrazine. Purification by VPC provides the product as a colorless oil. UV (CH₃OH) A% 274 at 293 mµ, A% 276 at 281 mµ, A% 354 at 225 mµ.

Analysis calculated for C₅HCl₅N₂:
C, 22.6; H, 0.4;   Cl, 66.6; N, 10.5;
Found: C, 22.7; H, 0.3;   Cl, 66.6; N, 10.9.

2,3-Dichloro-5-(trichloromethyl)pyrazine can also be prepared in greater yield by the direct chlorination of 2-(trichloromethyl)pyrazine in carbon tetrachloride solution at 240°–250° C.

USE OF CHLORINATED METHYLPYRAZINES AS INTERMEDIATES

Preparation 1

(3,5-Diamino-6-chloropyrazinoyl)guanidine

Step A: Preparation of 5-amino-3-chloro-2-(hydroxyiminomethyl)pyrazine

A solution of 221 g. (3.20 mole) of hydroxylamine hydrochloride in 640 ml. of water and 640 ml. of ethanol is buffered to pH 7.5 with 10M sodium hydroxide solution (requires ca. 300 ml. To this is added 63.2 g. (0.320 mole) of 2-chloro-3-(dichloromethyl)pyrazine (product of example 3) and the reaction mixture is refluxed for 5 hours. At the end of this period 280 ml. of solvent is distilled from the reaction solution which then is stored overnight in a refrigerator at 0°–10 C. The resulting orange-brown crystals are filtered, washed with 100 ml. of water and dried under reduced pressure at 100° C. to afford 18.1 g. (32.8 percent) of 5-amino-3-chloro-2-(hydroxyiminomethyl)pyrazine: m.p. 222°–223° C. (dec.); UV (CH₃OH) A% 495 at 348 mµ, A% 1207 at 283 mµ.

Analysis calculated for C₅H₅ClN₄O:
C, 34.8; H, 2.9;   Cl, 20.5; N, 32.5;
Found: C, 34.8; H, 2.7;   Cl, 20.5; N, 32.3.

Step B: Preparation of 5-amino-3-chloro-2-cyanopyrazine

To a vigorously stirred solution of 18.1 g. (0.105 mole) of 5-amino-3-chloro-2(hydroxyiminomethyl)pyrazine in 400 ml. of 1.0N sodium hydroxide is added 40 ml. of acetic anhydride dropwise over a 20 minute period. The temperature of the reaction mixture is maintained at 20°–25° C. using a cooling bath throughout the addition period. After stirring for an additional 10 minutes the precipitate is filtered, washed thoroughly with 300 ml. of water and dried at 80° C. at reduced pressure to yield 21.5 g. (95 percent) of crude 5-amino-3chloro-2-(acetoxyiminomethyl)pyrazine: m.p. 194°–197° C. (dec.), UV (CH$_3$OH) A% 474 at 347.5 m$\mu$, A% 1167 at 283 m$\mu$.

After grinding to a fine powder the crude acetate is suspended in 1 liter of xylene and vigorously stirred throughout a 16 hour reflux period. Decolorizing charcoal (0.50 g.) then is added to the hot xylene solution and the mixture then filtered. The yellow filtrate is stored in the refrigerator for 6 hours and the resulting yellow crystals removed by filtration, washed with 200 ml. of n-hexane and dried under reduced pressure at 80° C. to afford 11.7 g. (72 percent based on oxime) of 5-amino-3-chloro-2-cyanopyrazine: m.p. 161°–164° C.; UV (CH$_3$OH) A% 495 at 327 m$\mu$, A% 1329 at 272 m$\mu$.

Analysis calculated for C$_5$H$_3$N$_4$Cl:
C, 38.9; H, 2.0; N, 36.3;
Found: C, 39.2; H, 2.1; N, 36.6.

Step C: Preparation of methyl 5-amino-3-chloro-2-pyrazinoate

A solution of 5.00 g. (32.3 mmole) of 5-amino-3-chloro-2-cyanopyrazine in 10 ml. of concentrated sulfuric acid is heated on a steam bath for 35 minutes and then added to 500 ml. of absolute methanol and refluxed for 20 hours. The resulting solution is treated with 1.0 g. of decolorizing charcoal, filtered, concentrated to 300 ml. and cooled thereby affording methyl 5-amino-3-chloropyrazinoate as yellow needles which are filtered, washed with 10 ml. of methanol and dried at 100° C. under vacuum. The yield of product is 3.45 g. (57 percent): m.p. 245°–248° C. (dec.) UV (CH$_3$OH) A% 486 at 322.5 m$\mu$, 920 at 274 m$\mu$.

Analysis calculated for C$_6$H$_6$ClN$_3$O$_2$:
C, 38.4; H, 3.2;   Cl, 18.9; N, 22.4;
Found: C, 38.5; H, 3.1;   Cl, 18.8; N, 22.8.

Step D: Preparation of methyl 5-amino-3,6-dichloro-2-pyrazinoate

A slurry of 1.00 g. (5.33 mmole) of methyl 5-amino-3-chloro-2-pyrazinoate in 20 ml. of acetonitrile is maintained at 60°–65 C. for an additional 70 minutes. After cooling to room temperature the solid material is filtered, washed with 2 ml. of acetonitrile, dried and recrystallized from methanol-water to afford 0.51 g. (43 percent) of methyl 5-amino-3,6-dichloro-2-pyrazinoate as yellowish needles: m.p. 186°–187° C.; UV (CH$_3$OH) A% 437 at 326 m$\mu$, A% 697 at 273 m$\mu$.

Analysis calculated for C$_6$H$_5$Cl$_2$N$_3$O$_2$:
C, 32.5; H, 2.3;   Cl, 31.9; N, 18.9;
Found: C, 32.9; H, 2.1;   Cl, 32.2; N, 19.4.

Step E: Preparation of methyl 3,5-diamino-6-chloro-2-pyrazinoate

A solution of 0.20 g. (0.90 mmole) of methyl 5-amino-3,6-dichloro-2-pyrazinoate in 4 ml. of dimethyl sulfoxide is heated at 125° C. for 4 hours while anhydrous ammonia is bubbled into the reaction mixture. Addition of 5 ml. of water produces yellow needles which are filtered, washed with water, dried and recrystallized from acetonitrile to afford 0.08 g. (44 percent) of methyl 3,5-diamino-6-chloro-2-pyrazinoate, m.p. 207°–208.5° C., identical by mixture melting point, IR, UV, TLC and VPC with an authentic sample.

Step F: Preparation of (3,5-diamino-6-chloropyrazinoyl)quanidine

The ester obtained in step E is reacted with guanidine according to the procedure described in U.S. Pat. No. 3,313,813, example 79, to give (3,5-diamino-6-chloropyrazinoyl)guanidine, m.p. 240.5°–241.5° C. (dec.).

Preparation 2

(3,5-Diamino-6-chloropyrazinoyl)guanidine
Step A: Preparation of 3-chloropyrazinoic acid 2-Chloro-3-(chloromethyl)pyrazine (0.1 mole), product of example 1, is dissolved in 12 ml. of concentrated sulfuric acid and 28 ml. of water. The solution is boiled under reflux for 15 hours under nitrogen and treated with 34 ml. of concentrated nitric acid (70 percent) and 0.1 g. of ammonium vanadate and heated at 85° C. for 24 hours. The mixture is concentrated in vacuo to a syrup, diluted with 25 ml. of water and the pH adjusted to 1 with concentrated ammonia with cooling. The 3-chloropyrazinoic acid is collected on a filter, washed with water and dried.

Step B: Preparation of 3-aminopyrazinoic acid

A mixture of 1.58 g. (10.0 mmole) of 3-chloropyrazinoic acid in 25 ml. of anhydrous ammonia is heated at 100° C. for 5 hours. Evaporation of the ammonia leaves a white solid which upon solution in 20 ml. of water and acidification with 0.5 ml. of 12 N hydrochloric acid affords 3-aminopyrazinoic acid (0.75 g., 5.4 mmole, 54 percent) after filtration and drying, m.p. 202°–23.5° C. (dec.).

Step C: Preparation of methyl 3-aminopyrazinoate.

To a solution prepared by passing dry hydrogen chloride gas into chilled anhydrous methanol is added the 3-aminopyrazinoic acid product of step B in the form of a finely ground powder. The resulting suspension is stirred at room temperature for about 24 hours, the reaction mixture then concentrated under reduced pressure to about half its volume and the residue poured into ice water. The insoluble hydrochloride salt is collected and treated with aqueous sodium bicarbonate solution, with good stirring, to provide methyl 3-aminopyrazinoate.

Step D: Preparation of (3,5-diamino-6-chloropyrazinoyl)quanadine

The methyl 3-aminopyrazinoate obtained as described above is first converted to methyl 3-amino-5,6-dichloropyrazinoate then this product is amidated to form methyl 3,5-diamino-6-chloropyrazinoate which in turn is reacted with guanidine to provide (3,5-diamino-6-chloropyrazinoyl)guanidine by the procedures described in U.S. Pat. No. 3,313,813, examples 1 and 76.

PREPARATION 3

Pyrazinoic Acid Amide
Step A: Preparation of methyl 2-pyrazinoate

A solution of 2-(trichloromethyl)pyrazine (1.98 g., 10 mmole), a product of example 4, in 50 ml. of methanol is refluxed for 17.5 hours. After concentration to 2–3 ml. the reaction solution is shaken with 50 ml. of water and 50 ml. of ether. After separation, the ether layer is dried over magnesium sulfate, filtered and concentrated to give methyl 2-pyrazinoate shown by VPC analysis and IR and NMR (nuclear magnetic resonance) spectra to be identical with an authentic sample of methyl 2-pyrazinoate.

Step B: Preparation of pyrazinoic acid amide

The methyl 2-pyrazinoate obtained as described above is dissolved in methanol and treated with a methanolic solution of ammonia as described in U.S. Pat. No. 2,149,279 to provide the desired pyrazinoic acid amide product.

PREPARATION 4

(3-Aminopyrazinoyl)guanidine
Step A: Preparation of methyl 3-chloropyrazinoate

A solution of 2-chloro-3-(trichloromethyl)pyrazine (0.1 mole) in 600 ml. of methanol is refluxed for 18 hours, cooled, diluted with 600 ml. of water and extracted with ether. The ether layer is washed with water, dried over magnesium sulfate and concentrated to dryness to give methyl 3-chloropyrazinoate.

Step B: Preparation of methyl 3-aminopyrazinoate

By replacing the methyl 3,6-dichloro-5-aminopyrazinoate employed in preparation 1, step E, by an equimolecular quantity of the methyl 3-chloropyrazinoate obtained as described above and following substantially the same procedure described in preparation 1, step E, there is obtained methyl 3-aminopyrazinoate.

Step C: Preparation of (3-aminopyrazinoyl)guanidine

By replacing the methyl 3,5-diamino-6-chloropyrazinoate employed in preparation 1, step F, by an equimolecular quantity of methyl 3-aminopyrazinoate and following substantially the same procedures specified in step F of preparation 1 there is obtained (3-aminopyrazinoyl)guanidine.

PREPARATION 5

(3,5-Diamino-6chloropyrazinoyl)guanidine

Step A: Preparation of methyl 5-chloropyrazinoate

By replacing the 2-trichloromethylpyrazine employed in preparation 3, step A, by an equimolecular quantity of 5-chloro-2trichloromethylpyrazine, the product of example 6 and following substantially the same procedure described in preparation 3, step A, there is obtained methyl 5-chloropyrazinoate.

Step B: Preparation of 5-chloropyrazinoic acid

A suspension of methyl 5-chloropyrazinoate (41 mmole) in 50 ml. of 1.25N sodium hydroxide is shaken until solution results. The solution then is acidified with 10 ml. of concentrated hydrochloric acid and the resulting precipitate is filtered and dried yielding 5-chloropyrazinoic acid.

Step C: Preparation of 5-aminopyrazinoic acid

A mixture of 5-chloropyrazinoic acid (10 mmole) in 25 ml. of anhydrous ammonia is heated at 100° C. for about 5 hours. Evaporation of the ammonia leaves a solid which upon solution in 20 ml. of water and acidification with 0.5 ml. of 12N hydrochloric acid gives 5-aminopyrazinoic acid.

Step D: Preparation of methyl 5-aminopyrazinoate

Fuming sulfuric acid (65 percent, 0.18 mole) is cautiously added to 12 g. of methanol while keeping the temperature below 50° C. The solution is cooled to 25° C. and 30 g. of 5-aminopyrazinoic acid is added. The solution then is heated at 50° C. for 2½ hours, cooled to 25° C. poured onto 150 g. of ice and neutralized to pH 6 with 15N ammonium hydroxide keeping the temperature below 40° C. to give methyl 5-aminopyrazinoate which is separated by filtration and then washed with water.

Step E: Preparation of methyl 3,6-dichloro-5-aminopyrazinoate

A slurry of methyl 5-aminopyrazinoate (0.1 mole) in 400 ml. of acetonitrile is heated at 60° C. while chlorine (4.2 mole) is passed in over a period of 10 minutes. The mixture then is heated at 60° C. for 1 hour, cooled to 0°–5° C. and filtered to give methyl 3,6-dichloro-5-aminopyrazinoate.

Step F: Preparation of (3,5-diamino-6-chloropyrazinoyl)guanidine

By replacing the methyl 3,6-dichloro-5-aminopyrazinoate employed in step E of preparation 1 by the methyl 3,6-dichloro-5-aminopyrazinoate obtained as described above, and then following substantially the same procedures specified in steps E and F of preparation 1, there is obtained (3,5-diamino-6-chloropyrazinoyl)guanidine.

PREPARATION 6

Methyl 3,6-dichloro-5-aminopyrazinoate

Step A: Preparation of methyl 5,6-dichloropyrazinoate

By replacing the 2-(trichloromethyl)pyrazine employed in preparation 3, step A, by 2-trichloromethyl-5,6-dichloropyrazine, product of example 7, and following substantially the same procedure described in preparation 3, step A, there is obtained methyl 5,6-dichloropyrazinoate.

Step B: Preparation of methyl 5-amino-6-chloropyrazinoate

By replacing the methyl 5-chloropyrazinoate employed in preparation 5, step B, by the methyl 5,6-dichloropyrazinoate obtained as described above, and then following substantially the same procedure described in preparation 5, steps B through D, there is obtained methyl 5-amino-6-chloropyrazinoate.

Step C: Preparation of methyl 3,6-dichloro-5-aminopyrazinoate

By replacing the methyl 5-aminopyrazinoate employed in preparation 5, step E, by methyl 5-amino-6-chloropyrazinoate and following substantially the same procedure described in preparation 5, step E, with the exception that only 0.1 mole of chlorine is employed, there is obtained methyl 3,6-dichloro-5-aminopyrazinoate. It will be recognized that this is the same product as is obtained in preparation 5, step E.

While the above examples describe the preparation of certain novel chlorinated methylpyrazine products of this invention and the use of these novel chlorinated methylpyrazines in the preparation of therapeutically active 3-aminopyrazinoyl guanidine products, and a pyrazinamido product, is to be understood that the invention is not to be limited to the particular methods described but is to be understood to embrace obvious equivalents thereof within the knowledge of those skilled in the art.

What is claimed is:

1. The reaction of a product selected from methylpyrazine or a chlorinated methylpyrazine and chlorine in the presence of a solvent selected from acetic acid and carbon tetrachloride and at a temperature between reflux temperature and about 250° C. to provide a chlorinated methylpyrazine having the structure

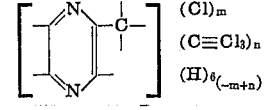

wherein $m$ represents the numerals two through five and $n$ is zero or one, with the proviso that when $n$ is one, the (C Cl$_3$) group is a nuclear substituent.

2. A modification of the process claimed in claim 1, wherein the chlorinated methylpyrazine product obtained is caused to react with hydroxylamine to provide a 5-amino-2-(hydroxyiminomethyl)pyrazine.

3. A process as claimed in claim 2, wherein the reaction mixture is heated at about reflux temperature.

4. A process as claimed in claims 2 or 3 wherein 2-chloro-3-(dichloromethyl)pyrazine and hydroxylamine are caused to react to provide 5-amino-3-chloro-2-(hydroxyiminomethyl)pyrazine.

* * * * *